Figure 1:
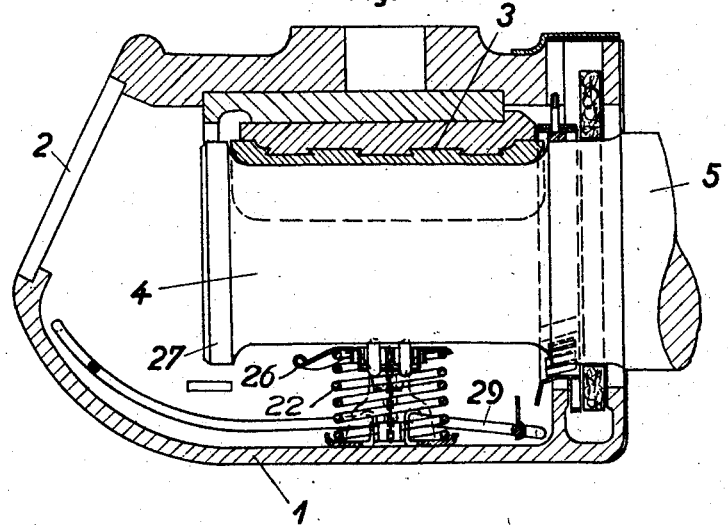
Figure 3:
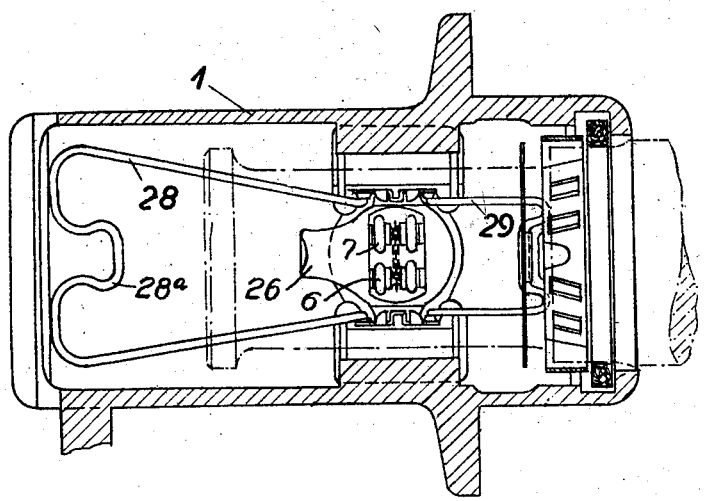

Nov. 30, 1926.　　　　　　　　　　　　　　　1,609,131
J. J. SCHNEIDER
BEARING WITH ROLLER LUBRICATORS
Filed August 26, 1921　　3 Sheets-Sheet 1

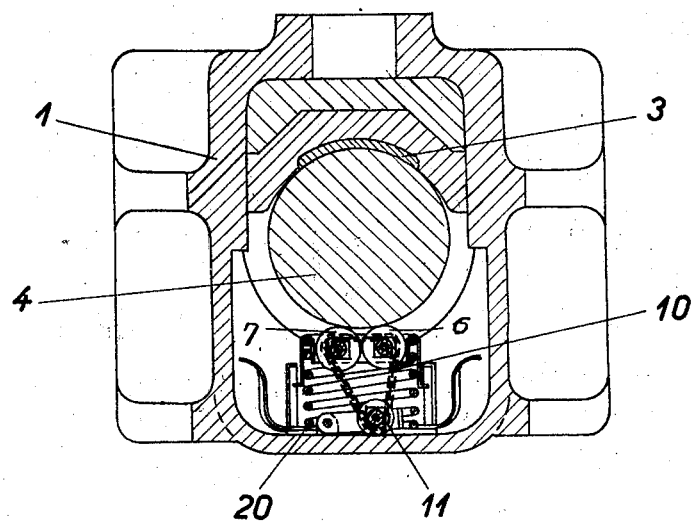

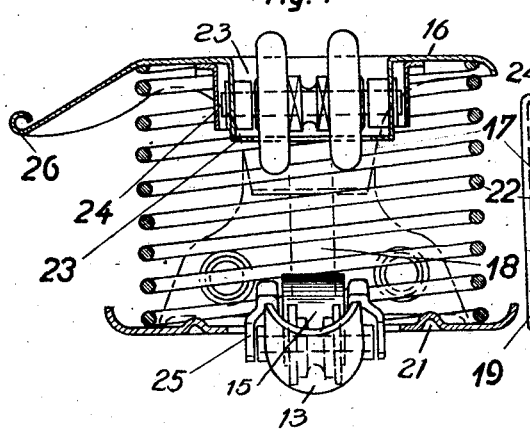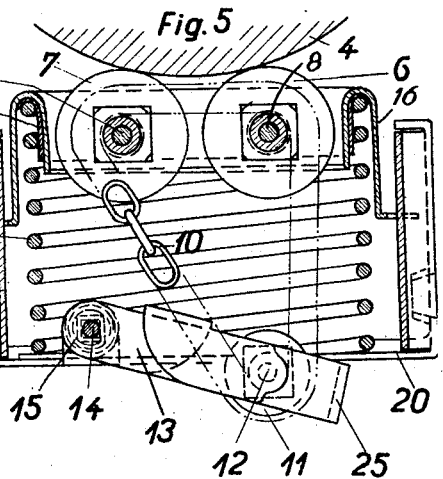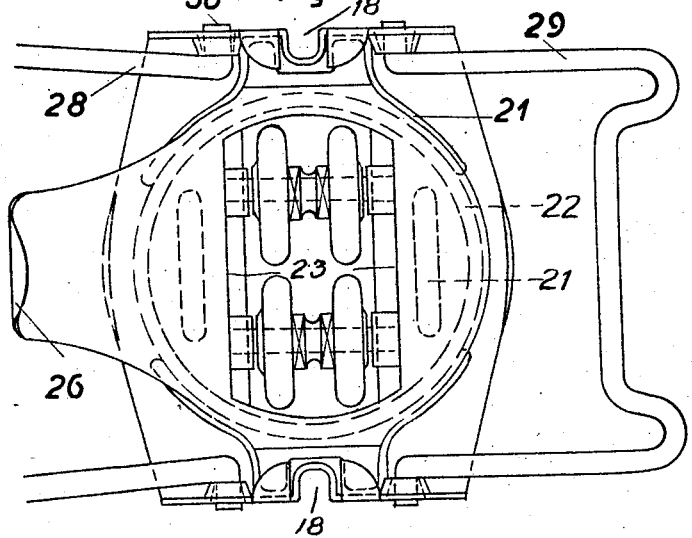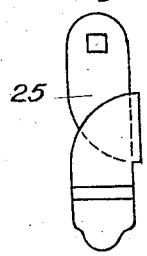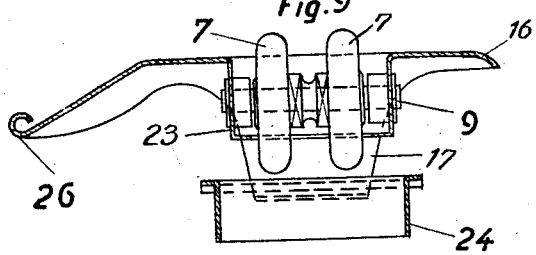

Patented Nov. 30, 1926.

1,609,131

UNITED STATES PATENT OFFICE.

JOHN JOSEF SCHNEIDER, OF FRANKFORT-ON-THE-MAIN, GERMANY.

BEARING WITH ROLLER LUBRICATORS.

Application filed August 26, 1921, Serial No. 495,540, and in Germany June 7, 1920.

The present invention comprises improvements in bearings with roller lubricators, especially for the journals of railway carriage axles, and the like, in which the lubrication is effected by two rollers with grooved peripheries, the grooves carrying an endless chain which feeds the oil from the oil well to the lubricating rollers, which latter are pressed against the axle journal from below in a flexible manner.

More particularly, the present invention relates to improvements in the invention described in the U. S. patent application of Waldemar Friedrich, Serial No. 405,551. In this known device the chain hangs down freely, and it may therefore easily happen that the operation of the rollers is irregular, so that the one roller runs somewhat faster than the other, or that one of the rollers jams, with the result that the upper portion of the chain sags between the two rollers and therefore its lower portion will no longer dip into the oil.

To prevent this sagging of the chain an additional guide is provided below for the chain, in the form of a third roller in the groove of which the chain also runs. This roller is rotatably mounted in a lever which is kept drawn downward by spring pressure, or also by its own weight. This ensures that the chain will not sag at the top but will also constantly dip into the supply of oil. The grooves of the lubricating rollers are preferably provided with pins or teeth, or the base of the groove is given the form of a chain sprocket, in order to impart a positive drive to the chain by the rotation of the rollers.

Another improvement consists in so arranging the small axles of the various rollers that they can easily be taken out, thus ensuring convenience in assembling combined with cheapness of production of the members themselves.

A further improvement consists in that the two rollers are pressed against the axle journal by means of a single spring, in contrast to the said U. S. patent application Serial No. 405,551 in which the frame carrying the lubricating rollers rests on two or more springs. It has been found that, when several springs are used, sufficient flexibility cannot be obtained with the small amount of height available in the construction, and consequently there is not sufficient yielding under the constant movements and vibrations of the journal. Moreover, when several springs are used, the dimensions of the whole device are somewhat large, and some difficulty is encountered in inserting the device into the axle box.

In order to improve the device in this respect, the frame carrying the rollers is arranged, according to the present invention, on a single spring. It is only in this way that a uniform type of construction of the roller-and-chain lubricating device can be obtained for all existing axle boxes; whilst at the same time the dimensions can be reduced to a minimum. The spring ensures adequate and uniform pressure of the lubricating rollers against the journal, and at the same time is adapted to serve as a kind of protecting cage for the whole of the moving parts of the device. This is also of great importance in connection with inserting the device into, and detaching it from the axle box.

The frame carrying the lubricating rollers is preferably of annular shape with channel cross section, so that the spring fits into the ring from below. The frame is provided with two lateral tongues, which engage in the guide members situated beside the spring, on the base plate, thus preventing the frame from turning out of position. The two guide members are made integral with the base plate of the device by stamping, which greatly simplifies and cheapens production. At the same time a rim or a seam can be formed on the base plate, to form an abutment for the large spring carrying the frame, thus securing the latter in place and enabling special lugs for holding the spring to be dispensed with.

A nose-shaped handle can be secured on the front of the frame, or made integral therewith, which also facilitates the removal of the device by guiding it round the front collar of the axle journal.

Finally, a bow preferably of wire, is attached to the whole device, so as to extend in front, nearly up to the cover of the axle box. The bow is formed into a loop in front, which serves as a handle enabling the whole device to be securely held for insertion into and withdrawal from the axle box.

The improvement is illustrated in the accompanying drawings, Fig. 1 showing an elevation of an axle box, with such a lubricating device, in longitudinal section; Fig. 2 a section at right angles thereto; and Fig.

3 a plan of the lubricating device, seen from above and with the axle journal removed. Fig. 4 is a side elevation, in partial section and on a larger scale, of the lubricating device by itself. Fig. 5 is the corresponding front elevation, also in partial section, and Fig. 6 the plan, viewed from above. Figs. 7, 8 and 9 represent details of the means of securing the pins of the lubricating rollers and the tension roller.

First, with regard to Figs. 1–9, the axle box is indicated by 1. It is provided in front with an opening 2 adapted to be closed by a cover, and carries the bearing bush 3 at the top. The journal 4, attached at the rear to the axle 5, projects into the box. The lubrication of this journal is effected by the two lubricating rollers 6 and 7 which are rotatably supported on the pins 8 and 9. The two rollers 6 and 7 are provided with peripheral grooves in which hangs a chain 10 that dips at the bottom into the supply of oil. The chain carries the oil to the lubricating rollers 6 and 7, which feed it to the journal 4.

Below, the chain is passed round a roller 11, which is also grooved and is rotatably mounted on the pin 12, which is secured to a lever 13. This lever 13 is adapted to turn on the pivot 14 and is kept constantly forced downward by a spring 15. In this way the chain is always kept in tension, so that it cannot sag while the roller dips in the oil in the sump or well usually present in axle boxes.

The two rollers are carried by the annular frame 16, which is of channel cross section, and made of pressed sheet metal. This frame is provided with the two lateral tongues 17, which are cut away in U-form, the resulting recess engaging round a pressed-out guide fillet 18 of the side pieces 19 which are made integral with the base plate 20. The base plate is provided with a projection, crimp or seam 21 against which bears, from the inner side, the bottom coil of a large spiral spring 22 which engages at the top in the channeled frame 16 and keeps the rollers 6 and 7 pressed against the axle journal 4. The spring is thereby held in position without any special means being needed for that purpose; and, in addition, the spring surrounds all the moving parts of the device and protects them from damage.

The axle pins 8 and 9 of the lubricating rollers 6 and 7 are merely inserted loosely in the flange, 23 of the frame, and are kept in position by a cover plate 24, so that, on this plate being detached, the pins can be very easily withdrawn and the rollers taken out. Similarly, the axle pin 12 of the lower roller is inserted loosely through holes in the lever 13, and is prevented from lateral movement by a channeled cover plate 25 which is subjected to the action of the spring 15. Consequently, the cover plate 25 can be detached, against the pressure of the spring 15, thus releasing both ends of the pin 12, which can then be taken out, leaving the roller 11 free.

In front, the frame 16 is also provided with a nose-shaped handle 26, which serves at the same time as a guide against the outer collar 27 of the journal when the device is inserted into, or withdrawn from, the axle box 1. To enable this insertion or withdrawal to be effected accurately, a wire bow 28 is provided, which extends forward nearly to the cover of the axle box, and is there formed into a loop 28ª that can be easily grasped in the hand, so that the whole device can be managed with one hand. In the rearward direction the loop is extended at 29, or a second smaller loop is put in to serve as a stop, so that the device also fits against the right place on the journal and remains in that position and cannot be shoved too far back when inserted in the axle box. The two bows 28 and 29 are suspended in holes stamped so as to protect toward the interior, in the guide members 18 by means of corresponding crank bends 30.

What I claim is:—

1. In a journal lubricator, a roller for contact with the journal and having a groove therein, an endless chain suspended in the groove of said roller and a spring-urged roller to maintain the chain taut.

2. In a journal lubricator, two parallel grooved rollers, an endless chain suspended from said rollers and lying in the grooves of the rollers and a spring-urged roller to maintain the chain length between the rollers taut.

3. In a journal lubricator, two parallel grooved rollers for contact with the journal, a chain suspended from said rollers, a third roller engaging said chain, and spring means to cause said roller to hold the chain taut.

4. In a journal bearing lubricator, a base plate having vertical guide members, a coil spring on said base plate, a frame having a pair of downwardly extending flanges and seating on said spring, a pair of parallel grooved lubricating rollers mounted between said flanges, said flanges and rollers passing within the spring.

5. In a journal bearing lubricator, a base plate having spring retaining crimps therein, a coil spring on said plate and retained by said crimps a frame on said spring having parallel, central flanges extending within the spring, and a pair of journal-lubricating rollers mounted in said flanges.

6. In a journal bearing lubricator, a base plate, a spring thereon, a frame mounted on the top of said spring and having parallel flanges projecting within the spring, a pair of parallel lubricating rollers mounted in said flanges and a nose on said frame to facilitate the application and withdrawal of the lubricator.

7. In a journal lubricator, the combination with a coil spring, of a frame on said spring having parallel flanges depending with the spring, lubricating rollers, axles for said rollers loosely passing through said flanges, a cover plate seated on the spring beneath said frame and arranged to prevent the disengagement of said axles from the flanges.

8. In a journal lubricator, a base plate having a bow extending to the front of said plate to form a handle, a coil spring on said plate, a frame on the spring having parallel flanges depending within the spring and a lubricating roller mounted between the flanges.

9. In a journal lubricator, a base plate having a bow extending to the front of said plate to form a handle, a coil spring on said plate, a frame on the spring having parallel flanges depending within the spring, a lubricating roller mounted between the flanges and a second bow at the rear of said plate to limit the rearward position of the lubricator.

10. In a journal lubricator, a base plate having lateral guide members substantially perpendicular to said plate, said guide members having pairs of inwardly punched openings, and bows each having their ends bent to form pintles that are arranged to enter a pair of said openings.

11. In a journal lubricator, a pair of journal-contacting lubricating rollers, an endless chain passing over said rollers, a tension roller for said chain, a pivoted lever, an axle loosely passing through said lever and roller, and a channel cover plate on said lever covering the ends of said axle and preventing its displacement from the lever.

12. In a journal lubricator, a base plate having spring-retaining crimps, and lateral guides having two pairs of pivot holes therein, a front loop forming a handle pivoted in one pair of holes, a rear loop acting as a positioning stop pivoted in the other pair of holes, a lever pivoted in said base plate, means to urge said lever toward said plate, a tension roll in said lever a coil spring retained on said plate by said crimps, a frame seated on the top of said spring, a pair of parallel lubricating rollers mounted in said frame and in said spring, and an endless chain passing over all the rollers and tensioned by said tension roller.

I claim the foregoing as my invention, I have signed my name.

JOHN JOSEF SCHNEIDER.